(No Model.) 9 Sheets—Sheet 1.
J. GREENSLADE.
THRASHING AND CLOVER HULLING AND DRESSING MACHINE.
No. 557,266. Patented Mar. 31, 1896.
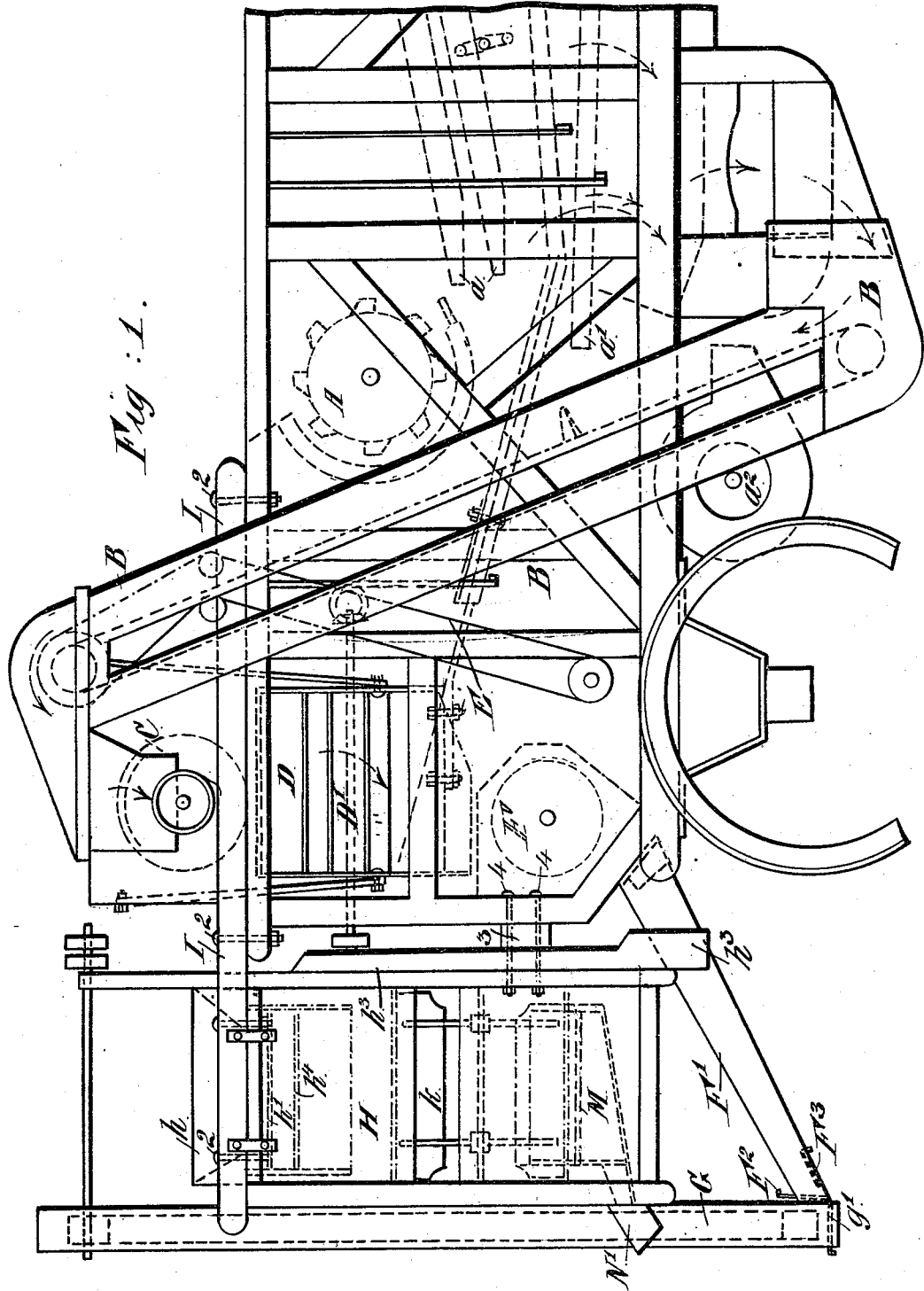

(No Model.) 9 Sheets—Sheet 2.
J. GREENSLADE.
THRASHING AND CLOVER HULLING AND DRESSING MACHINE.
No. 557,266. Patented Mar. 31, 1896.
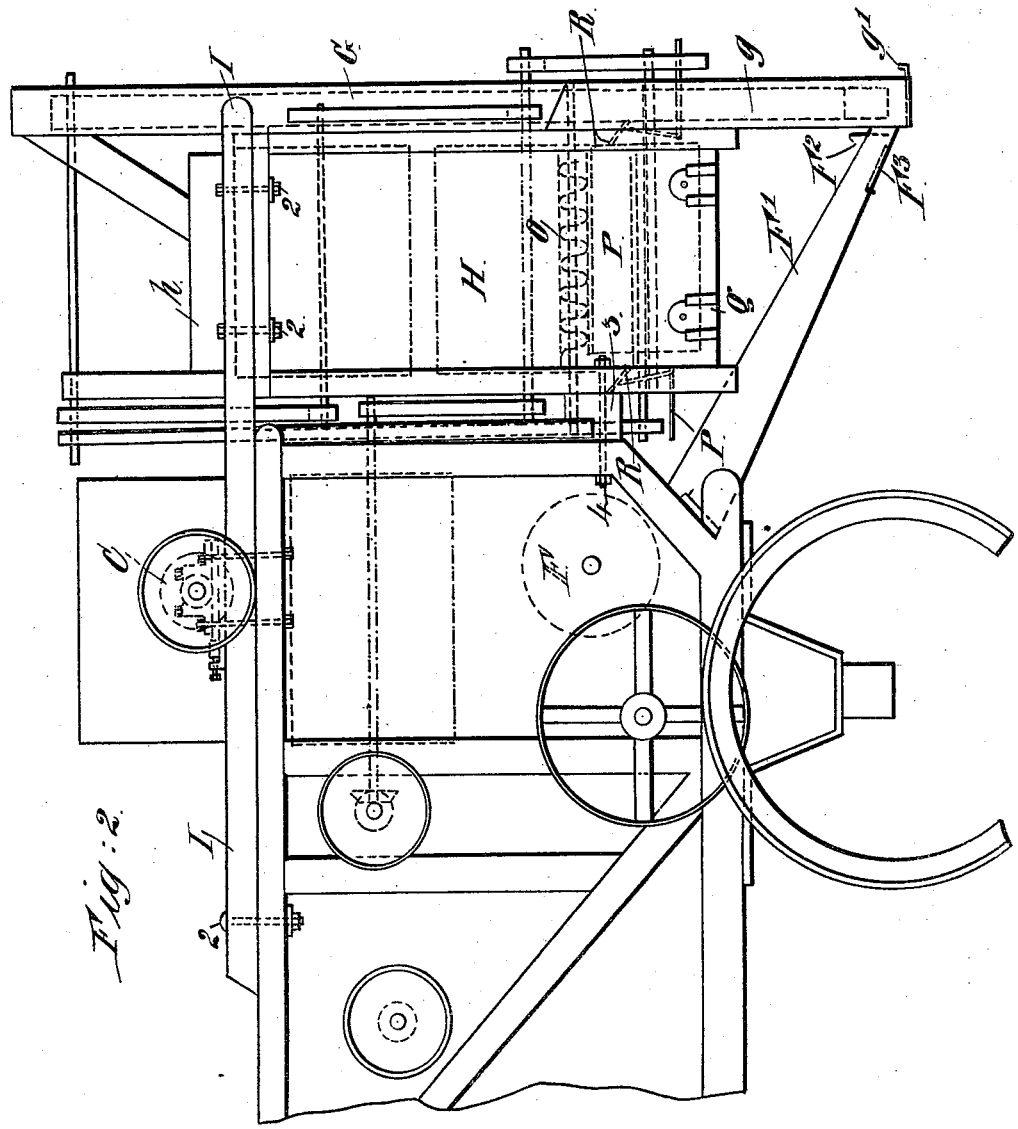
Witnesses
Henrie Hampton Rayward
Samuel Juming
Inventor
John Greenslade (No Model.) 9 Sheets—Sheet 3.
J. GREENSLADE.
THRASHING AND CLOVER HULLING AND DRESSING MACHINE.
No. 557,266. Patented Mar. 31, 1896.
Fig: 2ª
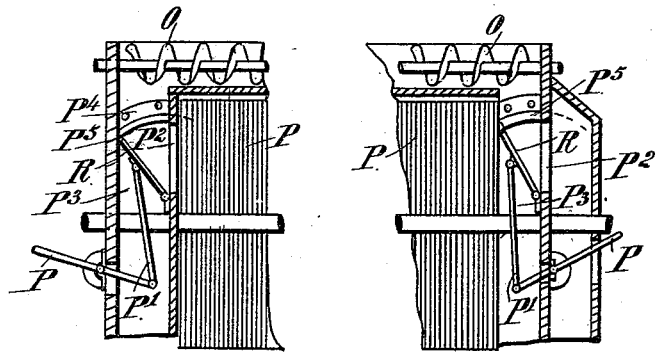
Fig: 15.
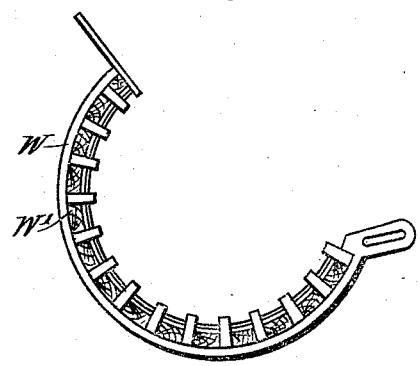
Witnesses
Henrie Hampton Rayward
Samuel Cuming
Inventor
John Greenslade

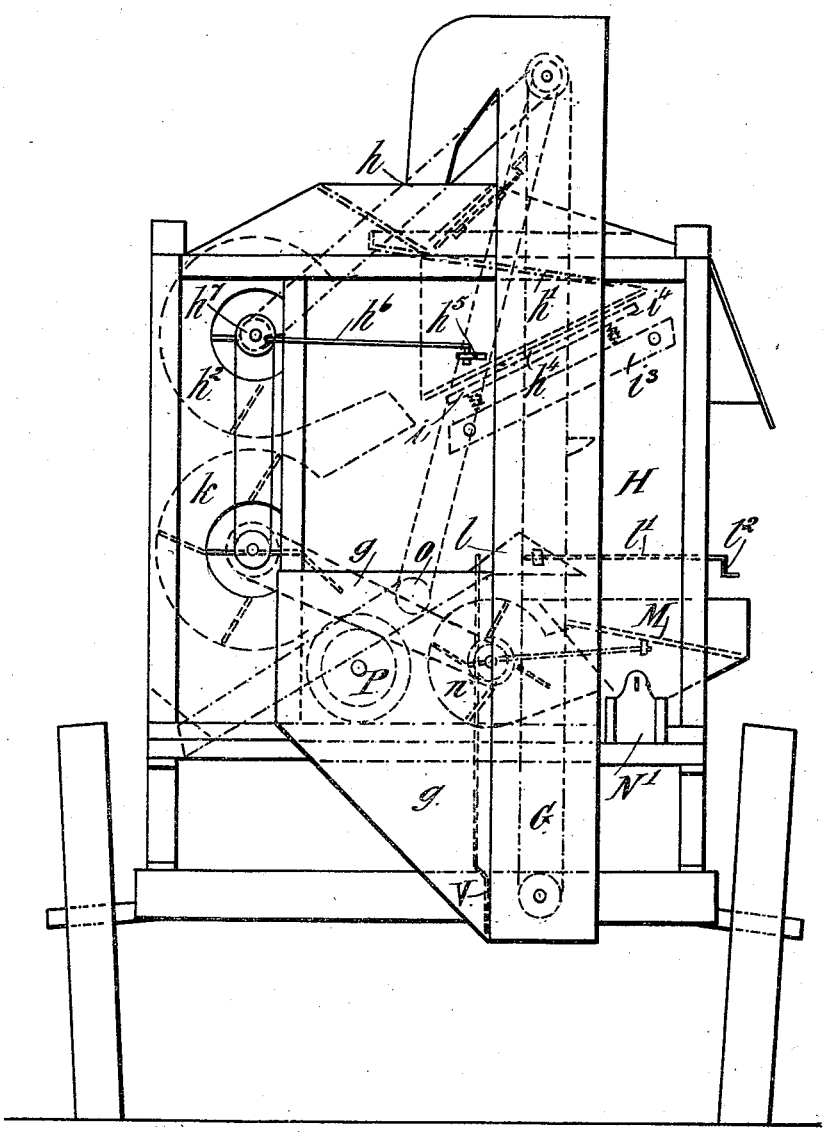

(No Model.) 9 Sheets—Sheet 5.
J. GREENSLADE.
THRASHING AND CLOVER HULLING AND DRESSING MACHINE.
No. 557,266. Patented Mar. 31, 1896.
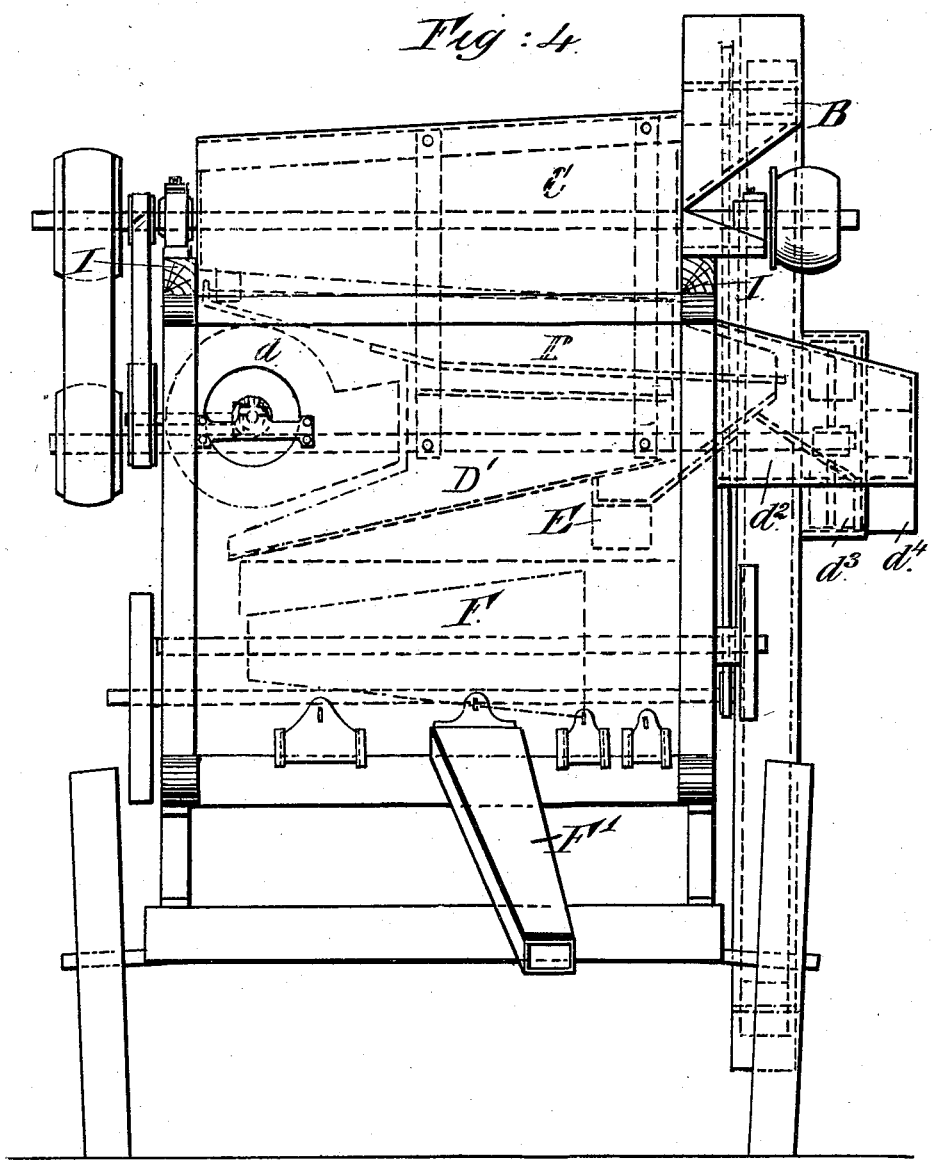
Witnesses
Henrie Hampton Rayward
Samuel Cuming.
Inventor
John Greenslade (No Model.) 9 Sheets—Sheet 6.

J. GREENSLADE.
THRASHING AND CLOVER HULLING AND DRESSING MACHINE.

No. 557,266. Patented Mar. 31, 1896.

Witnesses
Henrie Hampton Hayward.
Samuel Cuming.

Inventor
John Greenslade (No Model.) 9 Sheets—Sheet 7.
J. GREENSLADE.
THRASHING AND CLOVER HULLING AND DRESSING MACHINE.
No. 557,266. Patented Mar. 31, 1896.
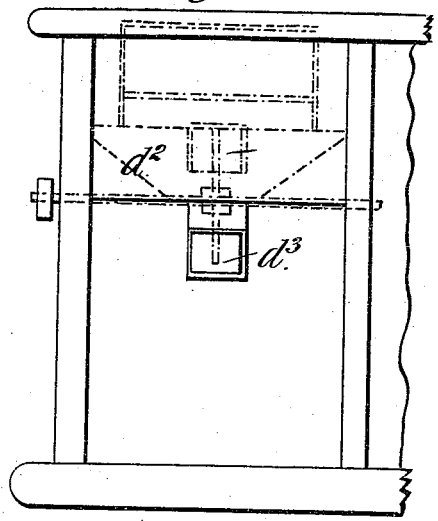
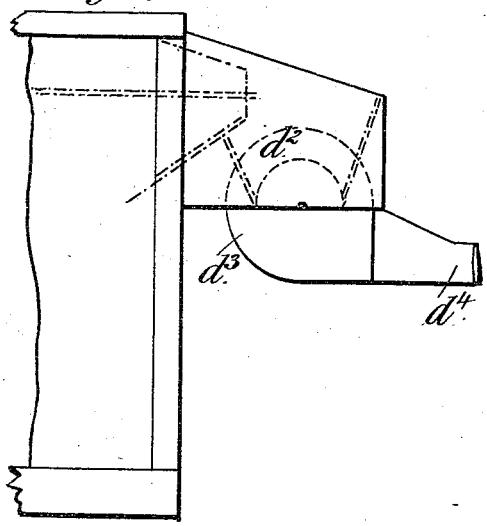
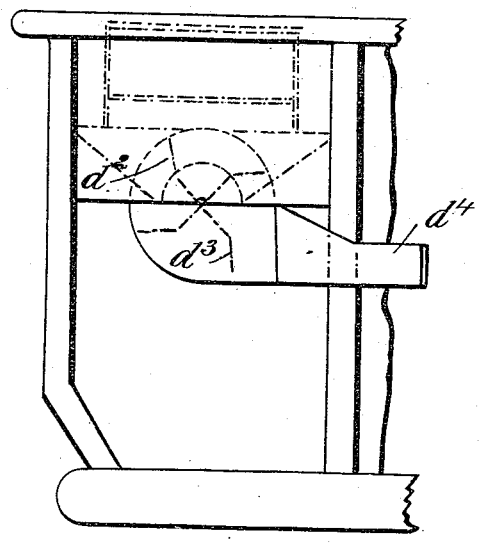

(No Model.) 9 Sheets—Sheet 8.

J. GREENSLADE.
THRASHING AND CLOVER HULLING AND DRESSING MACHINE.

No. 557,266. Patented Mar. 31, 1896.

Witnesses
Henrie Hampton Rayward.
Samuel Cuming.

Inventor
John Greenslade (No Model.) 9 Sheets—Sheet 9.
J. GREENSLADE.
THRASHING AND CLOVER HULLING AND DRESSING MACHINE.
No. 557,266. Patented Mar. 31, 1896.
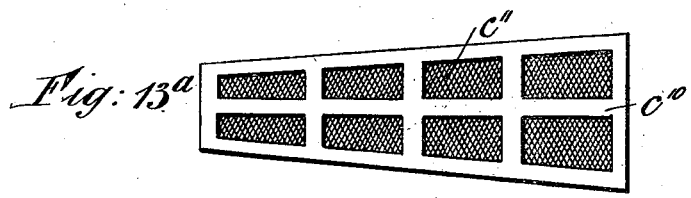
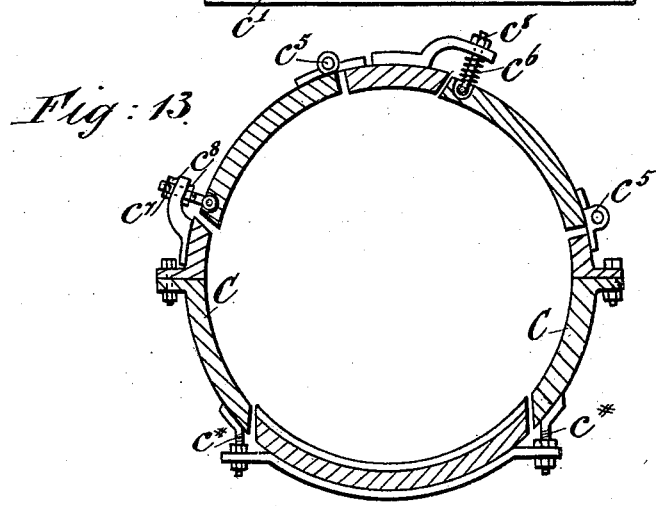
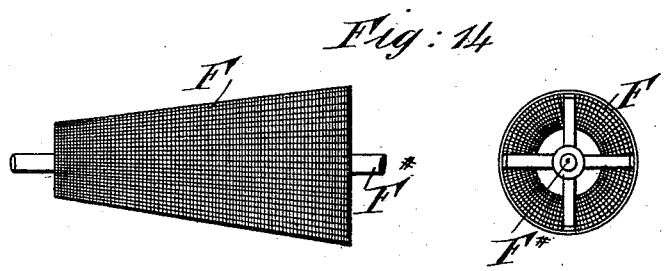
Witnesses
Henry Hampton Rayward
Samuel Cuming
Inventor
John Greenslade

UNITED STATES PATENT OFFICE.

JOHN GREENSLADE, OF CHRISTCHURCH, NEW ZEALAND.

THRASHING AND CLOVER HULLING AND DRESSING MACHINE.

SPECIFICATION forming part of Letters Patent No. 557,266, dated March 31, 1896.

Application filed September 7, 1895. Serial No. 561,798. (No model.) Patented in England April 26, 1894, No. 8,330.

*To all whom it may concern:*

Be it known that I, JOHN GREENSLADE, a citizen of the Colony of New Zealand, residing at 71 Cathedral Square, Christchurch, in the provincial district of Canterbury, New Zealand, have invented new and useful Improvements in Thrashing and Clover Shelling and Dressing Machines, of which the following is a specification.
This invention has for its object the provision of a combined machine which can be used as an ordinary grain-thrashing machine at one time and as a thrashing, shelling, and dressing machine for clover and other seeds at another, and also provides improvements in apparatus used in connection with shelling and dressing clover and other seed, and which was patented in England April 26, 1894, No. 8,330.
I construct the combined machine in a similar manner to an ordinary thrashing-machine, having drum, shakers, riddles, blowers, and an awner, the whole of which in thrashing grain are used in the ordinary way; but for the purpose of treating seed I alter the functions of some of the parts of the thrashing-machine and provide additional dressing apparatus, which I call a "finishing-dresser," for the purpose of freeing the seed from its impurities and rendering it fit for market, and I so attach it to the rear end of the machine that it may be readily removed. I may remove the awner and substitute it by a sheller, or I provide a sheller which may be readily converted into an awner, and I also provide a sheller which may, if desired, be used as an awner without alteration. I place the sheller above the framing of the machine behind the drum directly over the first dressing apparatus or beneath the framing at the delivery-chute from the caving-riddle. The sheller-casing may be conical or cylindrical in shape and made of sheet metal of suitable thickness. Ribs are attached by bolts or rivets to the inner surface of this casing, arranged either in a volute form or parallel to the axis. These ribs may be substituted for others when awning grain, or strips of iron or other suitable material which may be covered with woven wire are fixed to the casing between each of the ribs, so as to present a more even surface when grain is treated. It may also be used in this form as a sheller. I use beater-bars on the sheller-drum, the grooves in which are at such an angle that straight ribs may be used in the sheller-casing; but in using ordinary thrashing-machine beaters it is necessary to set the ribs in a volute form in the sheller.

When awning corn, I may set back the beaters by removing the liners between the beaters and drum-rings.

I may cut away a part of the sheller-casing and replace it by woven wire or perforated metal of suitable mesh to allow the unshelled seed, dust, and such substances to pass through. I may also make the sheller-casing with openings to receive one or more sections or framings containing woven wire or other reticular material. These framings are hinged at one side to the sheller and kept in position at the other by a spring, weighted lever, set-screws, or analogous means or hinges may be dispensed with and set-screws, springs, or analogous means used on both sides of the framings. These framings may thus be adjusted so as to allow seed and such substances to pass through to prevent the sheller from choking, and also to regulate the space between the beaters and the shelling-surface.

In order to prevent dust from entering the beater-spindle bearing from the sheller, I provide a disk, which may be adjusted upon the beater-spindle, and I may either form upon or attach to the face thereof a number of vanes, which in the revolution of the disk tend to throw the dust away from the bearing. The disk also serves to regulate the outlet from the sheller. I also attach a ring of angle-iron to the inside of the sheller-casing, which further tends to prevent dust from passing into the bearing.

In order to carry dust away from the machine, I attach a suitable dust-box to the side of the machine, into which it is blown during the dressing operation. An exhaust-fan is arranged to deliver the dust through a tube to any desired place. This fan may be placed inside or outside the dust-box; but I prefer to attach it to the drum-spindle, as by this arrangement no bearing or belting is required.

When desirable, I may treat the seed in a conical screen (which I term a "clover-screen") of perforated sheet metal or other reticular material, having a strip of iron or other material, arranged by a spring or suitable means to bear against its outer surface for the purpose of cleaning it.

I will now further describe the construction and operation of my machine with the aid of the accompanying drawings, wherein—

Figure 1 is an "off" side elevation of a combined machine constructed according to my invention; Fig. 2, a "near" side elevation of the rear portion thereof; Fig. 2ª, an enlarged view of the shutters in the finishing-dresser. Fig. 3 is an end view of the finishing-dressing apparatus. Fig. 4 is an end view with the finishing dressing apparatus removed. Fig. 5 is an off side elevation of the rear portion of a machine, illustrating my improvements. Figs. 6 and 7 are respectively a side and end elevation of a portion of the machine, illustrating the dust-box and the exhaust-fan. Fig. 8 illustrates the fan placed at right angles with the dressing-riddles. Fig. 9 is a detailed view of the "gridiron" cleaner; Fig. 10, a vertical cross-section of a sheller-casing, illustrating the employment of strips between the "ribs;" Fig. 11, a sectional elevation of a sheller having removable diagonal ribs, and Fig. 11ª a similar view illustrating the employment of straight ribs and diagonal grooved beater-bars. Fig. 11ᵇ shows one of the diagonal grooved beater-bars drawn to a larger scale. Fig. 12 is a section on line 12 12, Fig. 11; Fig. 13, a section of a sheller-casing, illustrating modes of attaching the sections or framings. Fig. 13ª shows one of the framings or sections detached. Fig. 14 illustrates a conical screen of reticular material. Fig. 15 shows the manner of closing the concave for partially shelling the seed.

Similar letters and numerals of reference indicate the same parts in all the figures.

Referring to Figs. 1 to 4, the seed, after being thrashed by the drum A, passes through the shakers $a$ and caving-riddle $a'$, the blower $a^2$ removing as much dust and seedless material as possible. The whole of the material, consisting of seed together with the cob or husk, is then delivered into the elevator B, which conveys it to the top of the machine into the sheller C. The material passes through the wire and out at the end outlet of the sheller C and falls onto a riddle D, which conveys the cavings into the dust-box. Any unshelled seed falls over the end of the riddle and is returned by the chute E to the caving-riddle $a'$, thence to the elevator B and sheller C. The dust is blown by a fan $d$ into a dust-box $d^2$ at the side of the machine. The seed falls through the riddles D upon another riddle D' and is blown by another fan $d'$, or, if preferred, it is passed through the conical clover-screen F, through which it passes into the chute F' having a shutter F², on opening which the seed will run into the elevator G, conducting it to a hopper $h$ at the top of the finishing or second dresser H. I support this second dressing apparatus H upon the thrashing-machine by means of the beams or battens 1, Figs. 1 to 4, which are secured by bolts 2 to the top of and project over the rear of the machine, the bolts 2 securing the dressing apparatus in position and allowing it to be readily removable at will. The distance-pieces 3, through which pass the bolts 4, are for the purpose of making the attachment thoroughly secure.

The material falls from the hopper $h$ upon the riddle $h'$ and is blown by a fan $h^2$, dust being blown away, and any straws or unshelled seed which may have escaped the first dresser falls over the end of the riddle $h'$ and down the chute $h^3$ into a sack. The seed falls through the riddle $h'$ upon the riddle $h^4$, through which the small seeds pass.

The riddle $h^4$ is operated by the bell-crank $h^5$ and connecting-rod $h^6$, which is eccentrically pivoted on a pulley $h^7$. The gridiron cleaner $i$ (clearly shown in Fig. 9) bears against the under side of the riddle $h^4$. The seed then falls in front of the fan $k$, when all light seed and other substances which have not fallen through the riddle $h^4$ are blown, together with all light seed which has fallen through it, over the deflector $l$. This deflector is for the purpose of separating the good seed from the light and is capable of adjustment by a screw $l'$ having a handle $l^2$ adjusting the distance between the fan $k$ and the deflector $l$, thereby regulating the separation, the light seed being blown farther by the blast than the good. The light seed, termed the "seconds," is now passed into a sack, or it may be passed over another riddle M and blown by another fan $n$ before being withdrawn through the delivery-chute N'.

The good seed falls from the riddle $h^4$ into a channel containing the screw conveyer O, which conveys it to one end of a revolving screen P to a discharge-chute, or, if desirable, this chute may be closed by a shutter R and the seed turned into the screen P, through which it passes into the hopper $g$ to the elevator G, by which it is returned to the top of the machine to be redressed continuously as long as the shutter R is closed.

By reversing the revolution of the screw conveyer O the seed is passed into a chute having two openings closed by a single shutter R, so that when one is closed the other is open. One of these openings discharges the seed through a chute into a sack, and the other, when open, allows the seed to pass into the hopper $g$ without going through the screen P. One of these double-acting shutters R is provided at either end of the screw conveyer O, (clearly shown in Fig. 2ª,) the lever-handle P serving, through the medium of the connecting-rod P', to open and close either the opening P² or P³ alternately. A piece of sheet-iron P⁴ attached to the shutter slides therewith under a fixed strip of sheet-iron P⁵, thus preventing any seed from passing through when the opening P² is closed. Thus by closing the opening leading to the sack and revolving the conveyer O in either direction the seed will continually return to the hopper $g$ and be redressed.

The slide $F^2$ in the chute $F'$ can be closed to prevent the seed from entering the elevator G when required. By this arrangement a given quantity can be repeatedly put through the dresser until perfectly cleaned while another such quantity is being shelled.

When desirable, the shutter R can be operated so as to discharge the dressed seed, when the shutter $F^2$ can be raised and a further quantity admitted to the hopper $g$ to be operated upon. A shutter V is also provided to close the opening from the hopper $g$ into the elevator G when desirable.

The chute $F'$ may be discharged through the shutter $F^3$ and the contents of the hopper $g$ withdrawn through the shutter $g'$ when required.

Instead of mounting the sheller C upon the top of the machine, as previously described, I may place it beneath the machine, as illustrated in Fig. 5, in a convenient position to receive the material to be shelled when discharged from the shoe of the return-board beneath the caving-riddle, a convenient means of supporting the sheller by means of the wrought-iron brackets $c\sharp$ being shown in the figure, the elevator B being employed to carry the shelled material to the top of the dressing apparatus.

The employment of ribs $c$ arranged in a volute form on the inside of the sheller-casing C is shown in Fig. 11.

The disk Y before referred to, adjustable upon and revolving with the beater-spindle $Y'$ to prevent dust getting into the bearing $Y^2$, is clearly illustrated in Fig. 11$^a$, which view also illustrates the employment of straight ribs $c$ on the inside of the sheller-casing, C beater-bars with diagonal ribs $C'$ being used.

Figs. 6, 7, and 8 illustrate two modes of arranging the exhaust-fan $d^3$ for carrying dust away from the machine during the dressing operation, the object of the employment of a fan being the delivery of the dust through the tube $d^4$ to any convenient place. Figs. 6 and 7 are respectively side and end elevations showing the fan mounted in a dust-box $d^2$ at right angles to the machine. Fig. 8 shows the fan arranged parallel with the machine. In both these arrangements the fan is driven by a pulley upon its spindle from any convenient part of the machine.

In Figs. 4 and 5 the fan $d^3$ is shown attached to and rotating with the thrashing-drum spindle, drawing the dust through the tube $d^4$ and delivering it through the tube $d^5$.

The gridiron cleaner hereinbefore referred to and illustrated in Fig. 9 consists of a number of hoop-iron strips $i$ secured in a framework $i^4$, which is mounted upon the springs $i^2$ carried upon battens $i^3$ secured to the sides of the dressing apparatus. The riddle $h^4$ bears lightly upon these strips, which serve to keep clear the openings in the riddle.

I find by experiment that it is best to arrange the ribs $c$ running in the contrary direction to the ribs on the beater-bars $c'$, as the shelling action is thereby greatly enhanced.

If desirable, I may make my sheller C in sections, as shown in Fig. 13. These sections or framings may have hinges $c^5$ securing them to the sheller-casing at one end, while they are kept in position at the other either by a spring, as shown at $c^6$, or by bolts, as shown at $c^7$, or analogous means, or I may dispense with the hinges $c^5$ and employ springs at both ends. These framings are capable of adjustment by the nuts $c^8$, so as to allow them to open when the sheller becomes too full and liable to choke. I may also arrange to secure one or more of the sections or framings to the sheller-casing by bolts, as shown at $c\sharp$, by which means I am able to readily regulate the space between the beaters and the shelling-surface.

Figure 5:
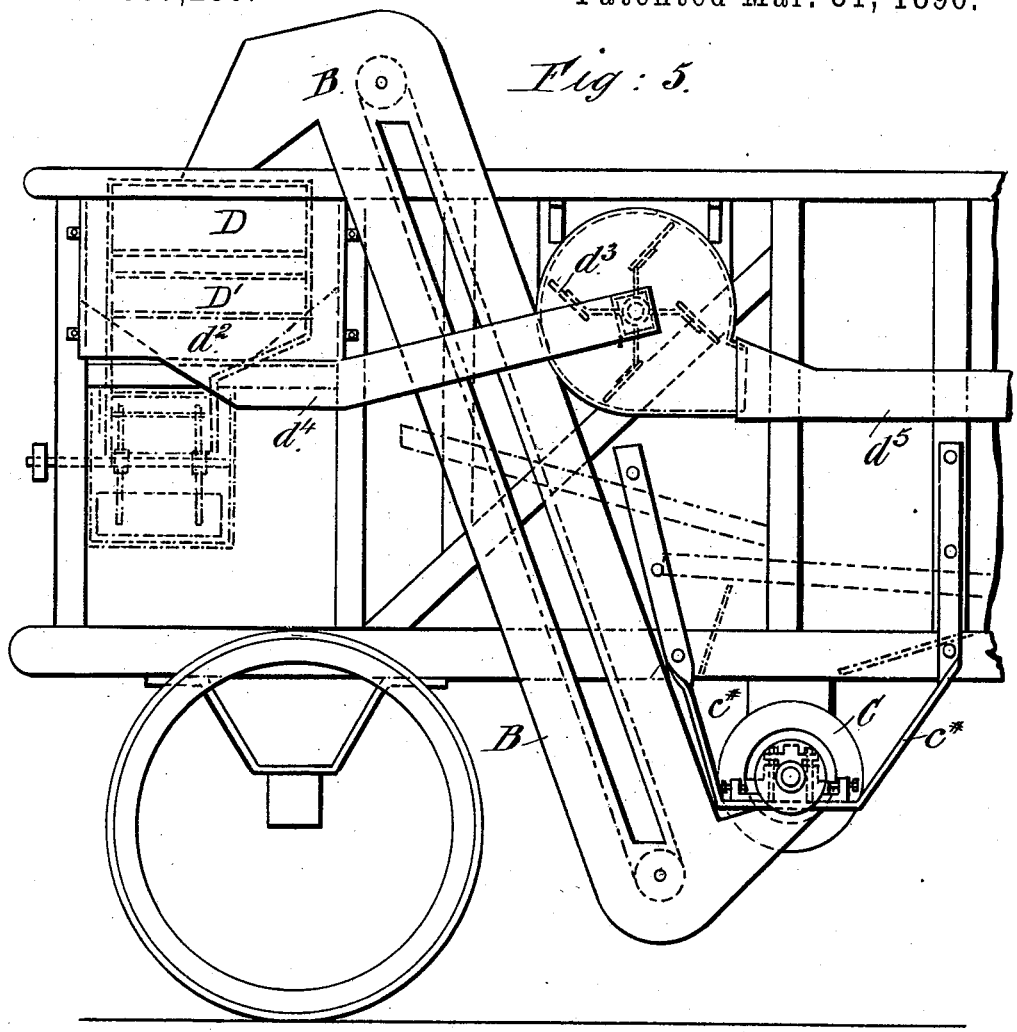
Figure 9:
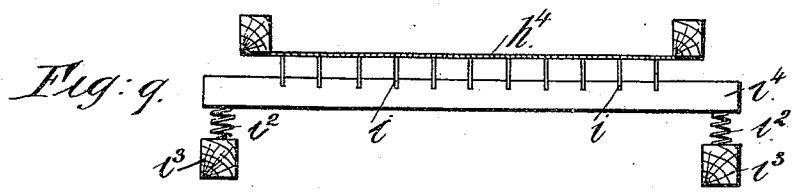
Figure 10:
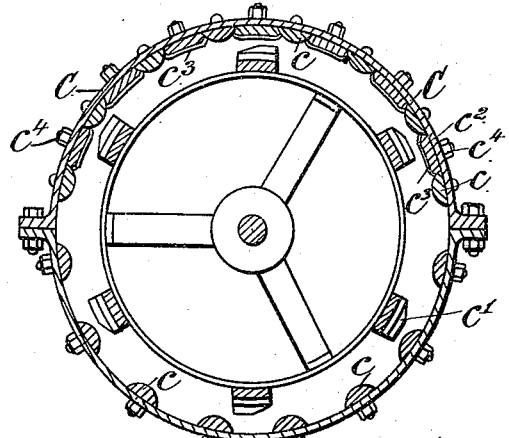
Fig. 10 shows a means I employ for adapting a sheller C for use as an awner, all or any of the spaces between the ribs $c$ of the sheller being filled up by strips of iron $c^2$ or similar material having woven wire $c^3$ or similar material upon their inner surface, the bolts $c^4$ being used to connect the strips $c^2$ to the sheller-casing, so as to permit of their removal when required.
Figure 11:
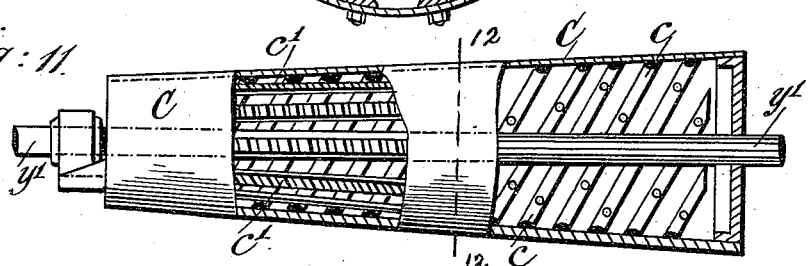
Figs. 11 and 12 illustrate a mode of constructing a sheller C with volute or diagonal ribs, which may be attached to the inner surface of the sheller by bolts or rivets.
Figure 12:
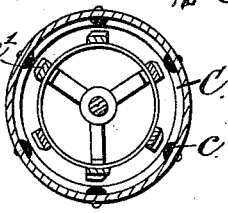
Figure 11A:
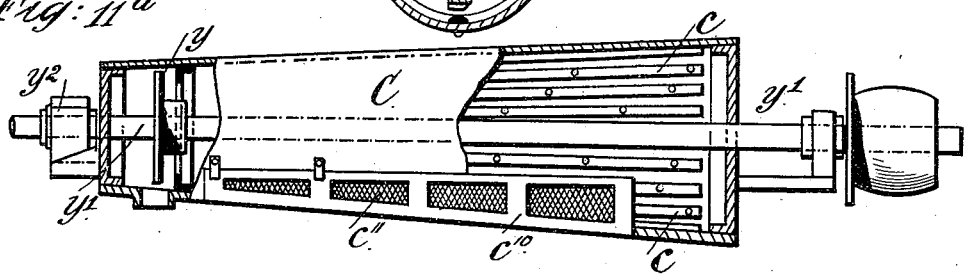

Figs. 11$^a$ and 13$^a$ illustrate my method of employing a sheller having sections or framings composed partly of woven wire. The sections $c^{10}$ are preferably made of cast-iron, with openings, as shown. The openings are covered by woven wire or similar reticular material $c^{11}$, through which shelled seed may pass and thus relieve the sheller. The sections are secured to the sheller-casing by bolts or other convenient means. Fig. 11$^a$ also illustrates the employment of straight ribs $c$ upon the inside of the sheller-casing C. These ribs are preferably made of wrought-iron and secured to the sheller-casing by bolts, so as to be removable when required. When using these straight ribs $c$, it is advisable to employ beater-bars on the sheller-spindle, with the grooves set at a very wide angle, as shown at $c'$, Fig. 11$^b$, as this secures a more perfect shelling of the seed.

My conical clover-screen (illustrated in Fig. 14) is made of woven wire or any similar reticular material F. It is caused to revolve by a suitable pulley upon the spindle $F\sharp$, which passes through it.

When thrashing clover or other like seeds, I blind up the concave W wholly or partially between the bars in front or behind the wires with strips of iron or wood $W'$, which causes the seed to be beaten round the concave instead of passing through it, which will have the effect of partially shelling the seed.

I drive the sheller from the engine, the sheller drives the thrashing-drum, and the finishing-dresser is driven by the first dresser, blower, or any other convenient motion.

In old thrashing-machines the awner, blower, and riddles may remain and be used when shelling, as the seed will fall from the sheller directly on the corn-dressing riddles.

What I do claim as my invention, and desire to secure by Letters Patent, is—

1. In combination with a clover thrasher and huller, a second dressing device comprising the sifting-screens, the fan coacting therewith, the second fan below the first, the deflector with means for moving it longitudinally toward and from said second fan, said deflector having two inclined sides, a channel arranged beneath one of said inclined sides, the spiral conveyer in said channel, a riddle beneath the opposite side, and a third fan coacting with said riddle, substantially as described.

2. In combination with a clover thrasher and huller, a second dressing device comprising the sifting-screens or riddles and the fan coacting therewith, the deflector for deflecting the good seed into a channel, a spiral conveyer in said channel, a cylinder P beneath the channel, a discharge-chute from said channel in proximity to the end of the cylinder, and a gate or deflector in said passage-way whereby the material may be discharged from the chute or passed into the cylinder as desired, substantially as described.

3. In combination with a clover thrasher and huller, a second dresser comprising a hopper and screens, a gravity separator beneath the same, a reversible spiral conveyer located in a channel and serving to collect the good material, a cylinder beneath the conveyer, a discharge-chute from one end of the channel having a reversible gate whereby the material may be discharged from the machine or turned into said cylinder, a hopper or elevator G leading to the hopper of the second dresser, and a passage-way from the opposite end of the channels also having a reversible gate whereby the material may be discharged or returned through elevator G and through the machine, substantially as described.

Dated this 5th day of June, 1895.

JOHN GREENSLADE.

Witnesses:
HENRIE HAMPTON RAYWARD,
SAMUEL CUMING.